(12) United States Patent
Gill et al.

(10) Patent No.: US 8,164,987 B2
(45) Date of Patent: Apr. 24, 2012

(54) THERMALLY ASSISTED MAGNETIC HEAD

(75) Inventors: Hardayal Singh Gill, Palo Alto, CA (US); Gurinder Pal Singh, San Jose, CA (US); Xiaoyu Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 704 days.

(21) Appl. No.: 12/260,924

(22) Filed: Oct. 29, 2008

(65) Prior Publication Data

US 2010/0103783 A1    Apr. 29, 2010

(51) Int. Cl.
*G11B 11/00*    (2006.01)
(52) U.S. Cl. ............. 369/13.14; 369/112.27
(58) Field of Classification Search ............ 369/13.13, 369/13.14, 13.02, 112.27, 13.33, 13.32, 13.24, 369/13.03, 13.12; 360/59, 235.4, 125.31, 360/128
See application file for complete search history.

(56) References Cited

U.S. PATENT DOCUMENTS

| | | | |
|---|---|---|---|
| 6,636,460 B2 | 10/2003 | Akiyama et al. | 369/13.14 |
| 6,721,237 B2 | 4/2004 | Kojima et al. | 369/13.13 |
| 6,762,977 B1 | 7/2004 | Gage et al. | 369/13.13 |
| 6,809,908 B1 | 10/2004 | Ito et al. | 360/317 |
| 6,954,340 B2 | 10/2005 | Shukh et al. | 360/317 |
| 6,975,580 B2 | 12/2005 | Rettner et al. | 369/300 |
| 7,027,248 B2 | 4/2006 | Hamaguchi et al. | 360/59 |
| 7,042,810 B2 | 5/2006 | Akiyama et al. | 369/13.33 |
| 7,729,085 B2 * | 6/2010 | Jin et al. | 360/125.31 |
| 2007/0159718 A1 | 7/2007 | Kim et al. | 360/125 |
| 2008/0204916 A1 | 8/2008 | Matsumoto et al. | 360/59 |

FOREIGN PATENT DOCUMENTS

JP    2002133608    5/2002

* cited by examiner

*Primary Examiner* — Ali Neyzari
(74) *Attorney, Agent, or Firm* — Zilka-Kotab, PC

(57) ABSTRACT

A magnetic write head arranged to maximize efficiency of an optical device used to locally heat a magnetic medium during use, also to maximize efficiency of a heater element for thermal fly height control. The magnetic head is constructed with a read head, a write head and a slider body. The write head is located between the read head and the slider body. A heater element can be located between the read head and the write head and an optical device such as an optical waveguide can be located between the write head and the slider body. The write head can be constructed to have a write pole that is closer to the slider body than the return pole is, thereby allowing the write pole to be adjacent to the optical device.

9 Claims, 3 Drawing Sheets

THERMALLY ASSISTED MAGNETIC HEAD

FIELD OF THE INVENTION

The present invention relates to magnetic heads for data recording, and more particularly to a structure for providing an auxiliary device such as a thermal heater and/or optical device adjacent to a write pole of a write head while also minimizing reader and writer spacing.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic head that employs an optical device such as an optical waveguide for locally heating a portion of a magnetic medium. The magnetic head includes a read head, a write head, a slider body and the optical device. The write head is located between the slider body and the read head, and the optical device is located between the slider body and the write head.

The write head can be configured with a magnetic write pole and a magnetic return pole, with the write pole being located between the return pole and slider body and adjacent to the optical device. This arrangement advantageously allows the optical device to be located adjacent to the write pole where medium heating is desired. This arrangement also advantageously reduces the spacing between the reader and writer by not requiring the optical device to be located between the reader and writer.

In another embodiment of the invention a write head structure includes a heater element located between the reader and writer. Again, the write head is located between the read head and the slider body. A head having such a structure advantageously provides equal heating of the read and write elements. In addition, placing the write element near the slider body allows the slider body to better operate as a heat sink to conduct heat away from the read and write heads. This structure also advantageously allows heating of the read element to be driven by the heater element rather than by the heat produced by the write head.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
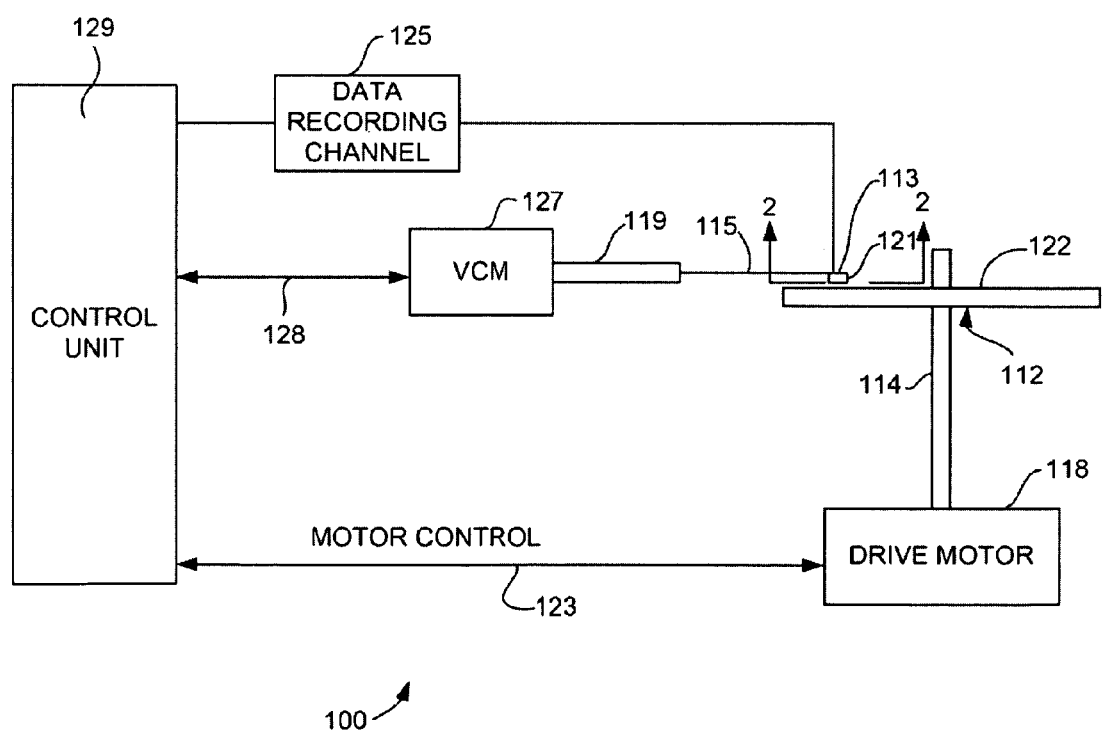
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 113 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
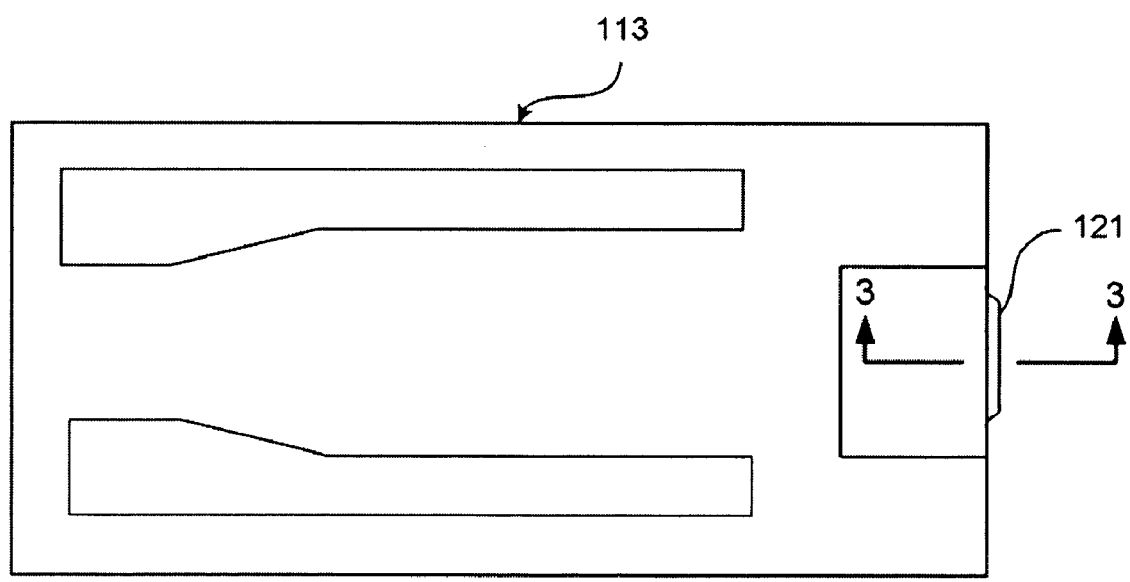
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
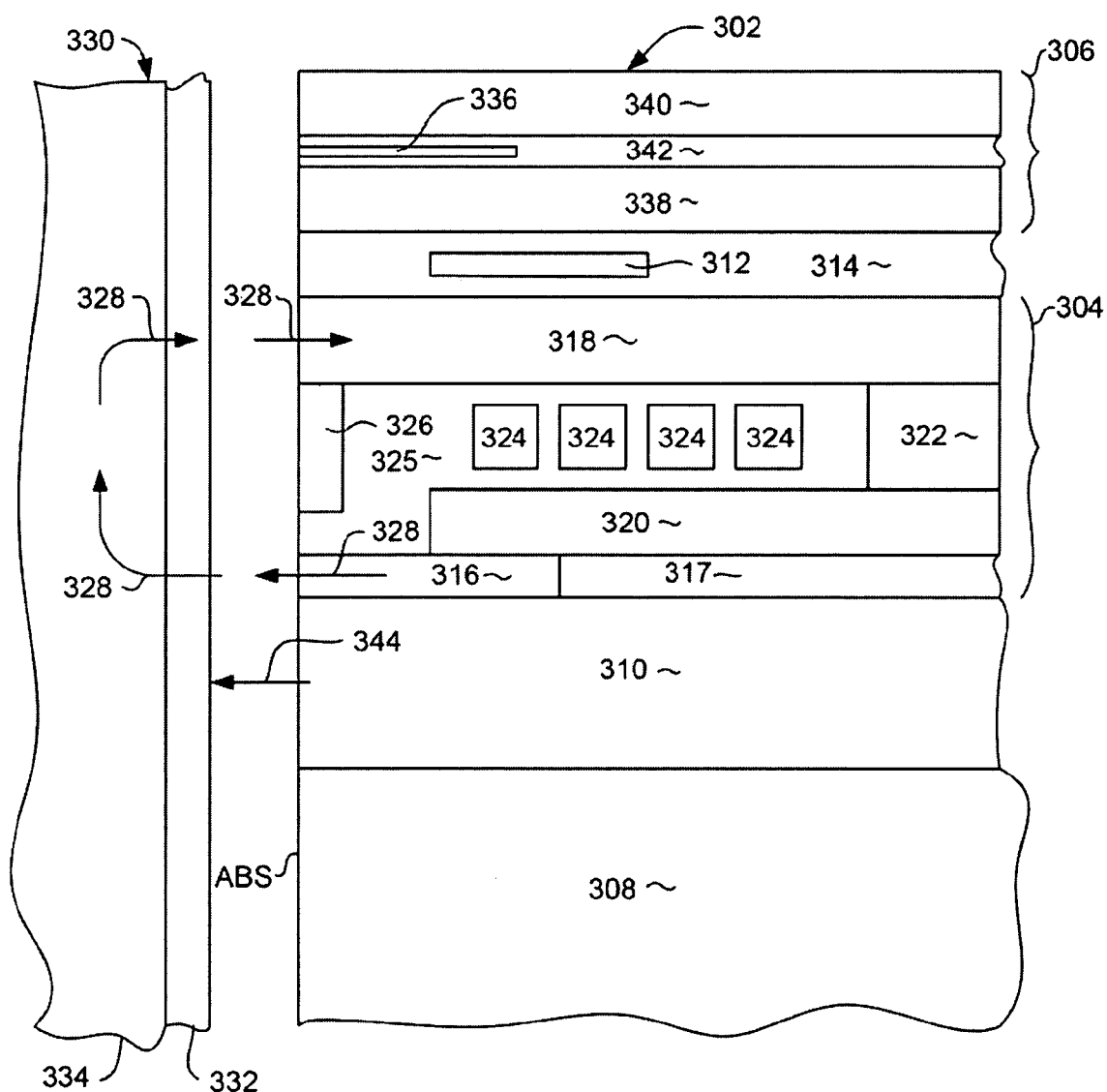
FIG. 3 is a cross sectional view of a magnetic head, taken from line 3-3 of FIG. 2 and rotated 90 degrees counterclockwise, of a magnetic read/write head according to an embodiment of the present invention.

With reference now to FIG. 3, the invention can be embodied in a magnetic head 302 having a structure that optimizes performance of both an optical device such as an optical wave guide for use in heating a magnetic medium and also a thermal heater that can be used for thermal fly height control. The head 302 includes a write head 304, and a read head 306, both of which are formed on a substrate 308, which is the body of the slider 113 described above with reference to FIG. 2. A first auxiliary device, which can be an optical device such as an optical waveguide 310 is located between the write head 304 and the substrate 308. In addition, a second auxiliary device such as a thermal heater 312 for thermal fly height control is located between the write head 304 and the read head 306. The heater 312 can be imbedded within an electrically insulating, material 314.

Therefore, it can be seen that the write head 304 is closer to the substrate 308 than the read head 306 is, so that the write head 304 is between the substrate 308 and the read head 306. In addition, the optical waveguide 310 is between the write head 304 and the substrate 308 and the heater element 312 is between the write head 304 and the read head 306. This arrangement of elements 308, 310, 304, 312, 306 provides great performance advantages, which will be described in greater detail herein below. However, before discussing these benefits, it is advantageous to discuss in greater detail, the structure and function of the read and write heads 304, 306 as well as the optical waveguide 310 and heater element 312.

Therefore, with continued reference to FIG. 3, the write head includes a magnetic write pole 316 and a magnetic return pole 318. The write pole 316 can be connected with a magnetic shaping layer 320, which is recessed from the air bearing surface (ABS) of the magnetic head 302 and which helps to conduct magnetic flux into the write pole 316. A non-magnetic, electrically insulating fill layer such as alumina 317 can be provided behind the write pole 316. The write pole 316 and shaping layer 320 can be magnetically connected with the return pole 318 by a magnetic back gap layer 322 in a region removed from the ABS. An electrically conductive write coil 324 passes through the write head 304, and may be embedded in a non-magnetic, electrically insulating material such as alumina and or hard baked photoresist 325. A magnetic trailing shield 326 may be provided at the ABS, extending from the return pole 318 toward (but not to) the write pole 316 in order to improve write field gradient for higher write resolution.

The write coil, only a portion of which is shown in cross section in FIG. 3, induces a magnetic flux through the return pole 318, back gap layer 322 shaping layer 320 and write pole 316. This in turn causes a magnetic write field 328 to emit from the tip of the write pole 316 toward a magnetic medium 330. The magnetic medium has a high magnetic coercivity top layer 332 and a magnetically softer underlayer 334. The write field 328 emitting from the write pole is sufficiently strong and concentrated that it magnetizes the top layer 332. The magnetic write field 328 then travels through the magnetically softer underlayer 334 before returning back to the return pole 318. Because the return pole 318 has a larger cross section (not shown) at the ABS than the write pole 316, the magnetic write field 328 does not re-magnetize the magnetically hard top layer 332 when returning back to the return pole 318.

The read head 306 includes a magnetoresistive sensor 336, which can be sandwiched between first and second magnetic shields 338, 340. A non-magnetic, electrically insulating material such as alumina 342 can fill the space between the shields 338, 340 that is not occupied by the sensor 336. The magnetoresistive sensor 336 can be a sensor such as a giant magnetoresistive sensor (GMR) or tunnel-valve magnetoresistive sensor (TMR) and can read the magnetic bits recorded by the write head 304.

As mentioned above, the head 302 includes a first auxiliary device 310 such as an optical device which can be an optical wave guide. The wave guide 310 can be used to focus a beam 344 such as from a laser (not shown). This highly focused beam 344 can be used to locally heat the layer 332 of the magnetic medium 330. As a real density increases and magnetic bit sizes become smaller, these magnetic bits become more and more prone to demagnetization. One way to overcome this is to increase the magnetic coercivity of the magnetically hard top layer 332 of the magnetic medium 330. However, if the coercivity of the top layer 332 is very high the magnetic write field 328 from the write pole 316 cannot magnetize the layer 332.

By locally heating the top layer 332 of the medium 330 the, the coercivity of the top layer 332 is temporarily reduced. The write field 328 can more easily magnetize this layer. Then, after a bit has been written to the layer 332, the layer 332 quickly cools and the magnetic bit recorded thereto remains magnetically stable. An example of a waveguide for use in heating a magnetic medium can be found in United States Patent Application US 2008/0239541 A1, which is incorporated herein by reference.

In order for the waveguide to operate most efficiently, it should be located as close as possible to the write pole 316. Another factor that greatly affects sensor performance is the spacing between the write head 304 and the read head 306. A large read/write separation is not tolerable in a high performance recording system. The space between the reader 306 and writer 304 causes a significant loss of useable space on a track of data, resulting in an undesirable loss of data density.

An arrangement of elements according to the present invention advantageously optimizes both goals of having a small spacing between the read head 306 and write head 304 and also having the optical waveguide be as close as possible to the write pole 316. As can be seen, the write head 304 is arranged closer to the slider substrate 308 than the read head 306 is. This is opposite to most currently manufactured heads wherein the read head 306 is manufactured before the write head 304 and is located closer to the slider substrate 308. In addition, the write pole 316 is located closer to the substrate 308 than the rest of the write head 304. This is also different from most currently manufactured write heads wherein the write pole is manufactured after other write head components and is further from the slider substrate than, for example, the return pole, write coil, shaping layer and back gap layer.

This unique arrangement, which essentially reverses the order of the write head build structure and also arranges the write head 304 closer to the slider 308 than the read head 306 advantageously allows the optical wave guide 310 to be located immediately adjacent to the write pole 316, while also allowing the optical wave guide to not be located between the read head 306 and write head 304 (thereby minimizing read/write spacing).

Another factor that greatly affects the performance of a magnetic head 302 is the fly height of the read head 306 and write head 304. The fly height is the distance between the air bearing surface (ABS) of the write and read heads 304, 306 and the magnetically hard top layer 332 of the magnetic medium 330. In fact, in high performance data recording systems, fly heights are so small that they can be measured in Angstroms. While the air bearing surface of the slider body 308 itself can be design to reduce fly height to some degree, the amount by which this fly height can be controlled aerodynamically is limited.

The thermal heater 312 can be used to very accurately control fly height. Applying an electrical current to the heater 312 causes the heater 312 to heat up. This in turn heats the adjacent write head 304 and read head 306. Consequently, thermal expansion of the materials making up the write and read heads 304, 306 causes the write and read heads 304, 306 to protrude outward from the ABS, thereby reducing the fly height of the read and write heads 306, 304. If a higher fly height is desired, the current to the heater element 312 can be reduced, causing the read and write heads 306, 304 to recede.

Previously, such heaters have been located adjacent to the slider body 308, with the read head being formed above the heater element and the write element being formed above the read head. This provides less than optimal results for a few reasons. First, with such an arrangement, the heater element does not heat both the read and write heads evenly. Therefore, while the write head may have a reduced fly height, the read element does not exhibit as much thermally induced protrusion and therefore does not have as greatly a reduced fly height as the write head. Further, placing the heater element adjacent to the slider results in a great deal of heat being lost to the slider body. The slider body is a large heat sink. This greatly reduces heater performance, requiring a larger heater element then would otherwise be necessary. Also, the write head produces its own heat as a product of the current flowing through the write head during operation. Placing the write element away from the slider body and adjacent to the read head causes the read head to exhibit thermal protrusion as a result of heat from the write element rather than from the intended heater element, and also prevents the slider body from conducting this unintended heat from the writer away from the writer and reader.

The arrangement of the present invention advantageously avoids all of these problems, resulting in greatly improved fly height control. For example, as can be seen in FIG. 3, the heater is located between the read head 306 and the write head 304. This allows heat from the heater to be evenly distributed to both the read head 306 and write head 304. In addition, forming the write head 304 closer to the slider body 308 than the read head 306, and placing the heater 312 between the read head and write head 306, 304 allows more of the undesirable heat from the write head 304 to be conducted to the slider body 308 (which as mentioned above is an excellent heat sink), and the presence of the heater 312 and insulation 314 between the read and write elements 306, 304 prevents heat from the write head 304 from conducting to the read head 306.

It can be seen then that the magnetic head structure 302 described with reference to FIG. 3 provides many advantages over prior art designs for various reasons that act synergistically to optimize sensor performance. These performance advantages apply both to the localized heating of the media as provided by the optical wave guide 310, and also to the thermally adjusted fly height control as provided by the heater element 312.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic head for data recording, comprising:
a slider body;
a write head;
a read head; and
a heater element; wherein
the write head is located between the read head and the slider body, and the heater element is located between the read head and the write head; and
wherein the write head further comprises a magnetic write pole and a magnetic return pole the magnetic return pole having a cross section at an air bearing surface that is smaller than a cross section of the return pole, the write pole being located closer to the slider body than the return pole is.

2. A magnetic head for data recording, comprising:
a slider body;
a write head;
a read head; and
a heater element; wherein
the write head is located between the read head and the slider body, the heater element is located between the read head and the write head; and
wherein the write head further comprises:
a magnetic write pole;
a magnetic return pole located further from the slider body than the magnetic write pole is;
a magnetic shaping layer, connected with the magnetic write pole; and
a magnetic back gap layer magnetically connecting the magnetic write pole and magnetic shaping layer with the magnetic return pole in a region removed from an air bearing surface.

3. A magnetic head for data recording, comprising:
a slider body;
a write head;
a read head; and
a heater element; wherein
the write head is located between the read head and the slider body, and the heater element is located between the read head and the write head; and further comprising:
an optical waveguide located between the write head and the slider body; and wherein the magnetic write head further comprises:
a magnetic write pole having a first cross section at an air bearing surface; and
a magnetic return pole having a second cross section at the air bearing surface, the first cross section being smaller than the second cross section, the magnetic return pole being further from the slider body than the magnetic write pole is.

4. A magnetic head for data recording, comprising:
a slider body;
write head;
a read head; and
a heater element; wherein
the write head is located between the read head and the slider body, and the heater element is located between the read head and the write head; and
further comprising:
an optical waveguide located between the write head and the slider body; and wherein the magnetic write head further comprises;
a magnetic write pole having a first cross section at an air bearing, surface; and
a magnetic return pole having a second cross section at the air bearing surface, the first cross section being smaller than the second cross section, the magnetic write pole being adjacent to the optical wave guide.

5. A magnetic head for data recording, comprising:
a slider body;
a write head;
a read head;
a heater element;
an optical waveguide located between the write head and the slider body; and wherein the magnetic write head further comprises:
a magnetic write pole having a first cross section at an air bearing surface;
a magnetic return pole having a second cross section at the air bearing surface, the first cross section being smaller than the second cross section, the magnetic write pole being adjacent to the optical wave guide;
a magnetic shaping connected with the magnetic write pole and recessed from the air bearing surface; and
a magnetic back gap layer connecting the magnetic shaping layer with the magnetic return pole in a region away from the air bearing surface; wherein
the write head is located between the read head and the slider body, and the heater element is located between the read head and the write head.

6. A magnetic head for data recording, comprising:
a slider body;
a read head;
a write head located between the read head and the slider body; and
an optical device located between the write head and the slider body;
wherein the write head further comprises a magnetic write pole having an end disposed at an air bearing surface and a magnetic return pole having an end disposed at an air bearing surface, the magnetic return pole having a larger cross section at the air bearing surface than the magnetic write pole, the magnetic write pole being closer to the optical device than the magnetic return pole is.

7. A magnetic head for data recording, comprising:
a slider body;
a read head;
a write head located between the read head and the slider body; and
an optical device located between the write head and the slider body;
wherein the write head further comprises a magnetic write pole having an end disposed at an air bearing surface and a, magnetic return pole having an end disposed at an air bearing surface, the magnetic return pole having a larger cross section at the air bearing surface than the magnetic write pole, the magnetic write pole being adjacent to the optical device.

8. A magnetic head for data recording, comprising:
a slider body;
a read head;
a write head located between the read head and the slider body;
an optical device located between the write head and the slider body;
a magnetic write pole adjacent to the optical device and having an end disposed toward an air bearing surface;

a magnetic return pole having an end disposed toward the air bearing surface and having a cross section at the air bearing surface that is larger than that of the magnetic write pole;

a magnetic shaping layer connected with the magnetic write pole and recessed from the air bearing surface; and a magnetic back gap layer connected with the magnetic shaping layer and the magnetic return pole.

9. A magnetic head as in claim 8 wherein the optical device is an optical waveguide.

* * * * *

UNITED STATES PATENT AND TRADEMARK OFFICE
CERTIFICATE OF CORRECTION

PATENT NO. : 8,164,987 B2  
APPLICATION NO. : 12/260924  
DATED : April 24, 2012  
INVENTOR(S) : Gill et al.

Page 1 of 1

It is certified that error appears in the above-identified patent and that said Letters Patent is hereby corrected as shown below:

In the claims:

Column 7, Line 25, please insert --and-- after "slider body," and before "the"

Signed and Sealed this
Twenty-third Day of April, 2013

Teresa Stanek Rea
*Acting Director of the United States Patent and Trademark Office*